(12) United States Patent
Tomiyama et al.

(10) Patent No.: US 11,677,285 B2
(45) Date of Patent: Jun. 13, 2023

(54) OUTER ROTOR TYPE MOTOR CAPABLE OF IMPROVING WITHSTAND LOAD PERFORMANCE IN RELATION TO EXTERNAL LOAD AND LIFESPAN

(71) Applicant: SHINANO KENSHI KABUSHIKI KAISHA, Nagano (JP)

(72) Inventors: Shou Tomiyama, Nagano (JP); Makoto Aida, Nagano (JP); Mario Fiorucci, Zurich (CH); Andreas Furrer, Zurich (CH); Stefan Wildhaber, Sankt Gallen (CH)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 108 days.

(21) Appl. No.: 17/198,402

(22) Filed: Mar. 11, 2021

(65) Prior Publication Data
US 2021/0328470 A1    Oct. 21, 2021

(30) Foreign Application Priority Data
Apr. 17, 2020    (JP) .............................. JP2020-074132

(51) Int. Cl.
*H02K 1/2786*    (2022.01)
*H02K 1/30*    (2006.01)
(Continued)

(52) U.S. Cl.
CPC ............. *H02K 1/30* (2013.01); *H02K 1/2786* (2013.01); *H02K 7/116* (2013.01); *H02K 21/22* (2013.01)

(58) Field of Classification Search
CPC .. H02K 1/2786; H02K 1/2791; H02K 1/2787; H02K 1/2788; H02K 1/2789; H02K 1/279; H02K 1/27915; H02K 1/28; H02K 1/30; H02K 7/003; H02K 7/116; H02K 3/34; H02K 3/345; H02K 3/50; H02K 5/165; H02K 5/1677; H02K 5/1737;
(Continued)

(56) References Cited

U.S. PATENT DOCUMENTS 5,635,781 A * 6/1997 Moritan ............... H02K 5/1677
310/67 R
2006/0103253 A1* 5/2006 Shiga ................... H02K 1/2786
310/43

FOREIGN PATENT DOCUMENTS

JP    H11-18356    1/1999
JP    2000-197333    7/2000
(Continued)

OTHER PUBLICATIONS

Noguchi, Machine Translation of JP11018356, Jan. 1999 (Year: 1999).*
(Continued)

*Primary Examiner* — Eric Johnson
(74) *Attorney, Agent, or Firm* — Stephen J. Weyer; Stites & Harbison, PLLC (57) ABSTRACT

A rotor hub comprises an inside cylindrical portion extending in an axial direction on an inner surface side of a rotor yoke and an outside cylindrical portion extending in the axial direction on an outer surface side of the rotor yoke, a motor gear wheel is integrally moulded on a portion of said outside cylindrical portion, and a rotor unit is assembled with a stator unit in such a way that a fixed shaft is inserted into a cylindrical hole in the rotor hub and a rotor magnet and pole teeth are facing.

3 Claims, 5 Drawing Sheets

(51) Int. Cl.
*H02K 7/116* (2006.01)
*H02K 21/22* (2006.01)

(58) Field of Classification Search
CPC ........ H02K 21/22; H02K 21/222; H02K 3/32; H02K 3/325
See application file for complete search history.

(56) References Cited

FOREIGN PATENT DOCUMENTS

| | | |
|---|---|---|
| JP | 2001298893 | 10/2001 |
| JP | 2004-222464 | 8/2004 |
| JP | 2014018068 | 1/2014 |

OTHER PUBLICATIONS

Notification of Refusal dated Feb. 8, 2022 in Japanese Patent Application No. 2020-074132.

* cited by examiner

OUTER ROTOR TYPE MOTOR CAPABLE OF IMPROVING WITHSTAND LOAD PERFORMANCE IN RELATION TO EXTERNAL LOAD AND LIFESPAN

CROSS-REFERENCE TO RELATED APPLICATION

This application is based upon and claims the benefit of priority of the prior Japanese Patent Application No. 2020-074132, filed on Apr. 17, 2020, and the entire contents of which are incorporated herein by reference.

TECHNICAL FIELD

The present invention relates to an outer rotor type motor equipped with a power transmission portion, which is used as a drive source in an electric motor such as a damper actuator for air conditioning in a building, for example.

BACKGROUND ART

In an outer rotor type DC brushless motor, a metal attachment plate is supported by a metal bearing housing made of brass or the like, for example, and a circuit board is assembled as a single piece with said metal attachment plate. An oil-containing bearing is assembled inside the bearing housing, and a rotor shaft is rotatably supported by the oil-containing bearing.

One end of the rotor shaft is joined as a single piece to a rotor hub that holds a rotor yoke. A metal component made of brass or the like is used for the rotor hub, and said rotor hub is swaged with the cup-shaped rotor yoke and assembled as a single piece therewith. Furthermore, a metal motor gear wheel is press-fitted to another end (output end) of the rotor shaft.

A stator is assembled as a single piece with the bearing housing. Specifically, an annular core back portion of a stator core is press-fitted and bonded to the outer circumference of the bearing housing and assembled therewith. Furthermore, a coil is wound, with an insulator interposed, on pole teeth extending radially outside of the core back portion. Magnetic flux action surfaces constituted by tooth tips of the pole teeth are assembled in such a way as to face an annular rotor magnet provided on the inner circumference of the rotor yoke. A blower which is conventionally used is preferably small on the one hand, while on the other hand the performance requirements need to be improved in terms of high pressure, high flow rate and high responsiveness. There is therefore a shift towards making impellers smaller and making them rotate at a higher speed.

Metal components are used for the bearing housing and the bearing, which are constituent components on the stator side of an outer rotor type motor, and metal components are also used for the rotor shaft and the rotor yoke, etc., which are constituent components on the rotor side that are rotatably supported by the bearing, the rotor hub and the rotor shaft being assembled as a single piece by means of press-fitting, etc. (see Patent Document 1: JP 2001-298893 A, and Patent Document 2: JP 2014-18068 A).

SUMMARY OF INVENTION

Technical Problem

In the abovementioned motor, however, metal components are used for the oil-containing bearing, the bearing housing, the attachment plate, and the motor gear wheel, etc. for reasons such as maintaining axial perpendicularity of the rotor shaft and maintaining withstand load performance, and the production cost (component cost) therefore increases.

In order to reduce the cost price, it would be feasible to reduce the component cost as far as possible by using a resin to form the constituent components of the motor. In this case, using a resin to form the motor components brings the following concerns.

(1) If the motor gear wheel is formed from a resin, there is a risk that it will not be possible to ensure a sufficient shaft clamping force with the rotor shaft. It is also feasible to subject the rotor shaft to knurling or D-cutting, but this would raise the processing costs.

(2) If the oil-containing bearing and the bearing housing are formed from a resin, there is a risk of a reduction in the withstand load performance in relation to external loads, and the lifespan.

Solution to Problem

The present invention has been devised in order to solve the abovementioned problems, and the objective thereof lies in providing an outer rotor type motor equipped with a power transmission portion, which makes it possible to keep processing costs down for motor components, and reduce the assembly workload by reducing the number of components, while also making it possible to maintain the withstand load performance in relation to external loads, and the lifespan.

In order to solve the abovementioned problems, the present invention comprises at least the following configuration.

An outer rotor type motor equipped with a power transmission portion, in which a rotor is rotatably assembled radially outside a stator, and the power transmission portion is provided on an output shaft of the rotor, said outer rotor type motor equipped with a power transmission portion being characterized in that it comprises: a stator unit having a stator core comprising a plurality of pole teeth protruding radially outside of a core back portion formed in an annular shape, and an insulator with which a fixed shaft inserted into a centre hole in the core back portion is integrally moulded by means of a first resin material covering the stator core; and a rotor unit in which an annular rotor magnet is provided on an inner circumferential surface of the rotor formed in a cup shape, and the power transmission portion is integrally moulded on an outer surface of a rotor hub comprising at least a second resin material, and the stator unit and the rotor unit are assembled in such a way that the fixed shaft is inserted into a cylindrical hole in the rotor hub and the rotor magnet and the pole teeth are facing, said rotor unit being assembled in such a way as to be slidable and rotatable about the fixed shaft.

By virtue of the abovementioned configuration, it is possible to reduce the number of components as far as possible and to reduce production costs by employing a resin to form the constituent components of a motor in which metal components are normally used for a rotor yoke, a bearing, a bearing housing, an attachment plate, and a motor gear wheel, etc.

Furthermore, at least the rotor hub of the rotor unit comprises a second resin material such as an engineering plastic, for example, and the power transmission portion (motor gear wheel, coupling portion, etc.) is integrally moulded on an outer surface of said rotor hub, so it is possible to ensure a sufficient shaft clamping force between the power transmission portion and the rotor hub, instead of a rotor shaft, and processing costs can be reduced because knurling or D-cutting is unnecessary.

Furthermore, it is possible to maintain the withstand load performance of a motor in relation to an external load, and the lifespan, by making an axial distance between load support points from the power transmission portion provided on the outer surface side of the rotor hub to the cylindrical hole in the rotor hub longer than it would be conventionally.

Preferably, at least the periphery of the core back portion and the pole teeth is covered by means of the insulator, and the centre hole in the core back portion is closed off by means of the insulator joined to the fixed shaft.

As a result, the periphery of the core back portion and the pole teeth is covered by means of the insulator, so there is no need for an operation to assemble the insulator with the stator core afterwards, and since the centre hole in the core back portion is closed off by means of the insulator, there is no need for an operation to assemble the stator core with a bearing holder, etc., as would be the case conventionally, and the ease of assembly is also improved by reducing the number of components.

The rotor unit may be formed by integrally moulding a rotor yoke formed in a cup shape and the rotor hub comprising a resin material.

As a result, there is no need for an operation to assemble the rotor shaft with the rotor yoke, and the ease of assembly is also improved by reducing the number of components.

The rotor hub may comprise an inside cylindrical portion extending in an axial direction on an inner surface side of the rotor and an outside cylindrical portion extending in the axial direction on an outer surface side of the rotor, a motor gear wheel may be integrally moulded on a cylinder end portion of said outside cylindrical portion, and the rotor unit may be assembled by inserting the inside cylindrical portion of the rotor hub into the centre hole in the core back portion.

Alternatively, the rotor hub may comprise an inside cylindrical portion extending in an axial direction on an inner surface side of the rotor and an outside cylindrical portion extending in the axial direction on an outer surface side of the rotor, a coupling portion may be formed on said outside cylindrical portion, and the rotor unit may be assembled by inserting the inside cylindrical portion of the rotor hub into the centre hole in the core back portion.

As a result, it is possible to lengthen the distance between load support points from the power transmission portion (motor gear wheel or coupling portion) by increasing the axial length of the inside cylindrical portion of the rotor hub, and it is also possible to lengthen the axial distance between load support points from the inside cylindrical portion of the rotor hub to the power transmission portion by providing the motor gear wheel or the coupling portion on the cylinder end portion of the outside cylindrical portion of the rotor hub. It is therefore possible to maintain the withstand load performance of the motor in relation to external loads, and the lifespan.

Advantageous Effects of Invention

It is possible to provide an outer rotor type motor equipped with a power transmission portion, which makes it possible to keep processing costs down for motor components, and reduce the assembly workload by reducing the number of components, while also making it possible to maintain the withstand load performance in relation to external loads, and the lifespan.

DESCRIPTION OF EMBODIMENTS

An example of an outer rotor type motor equipped with a power transmission portion will be described below with reference to the appended drawings. The description will be given using a gear wheel-equipped outer rotor type motor that comprises a gear wheel as one example of the power transmission portion. A gear wheel-equipped outer rotor type motor refers to a motor in which a rotor is rotatably assembled on a radial outer side of a stator, and a gear wheel is provided on an output shaft of the rotor.

Figure 1:
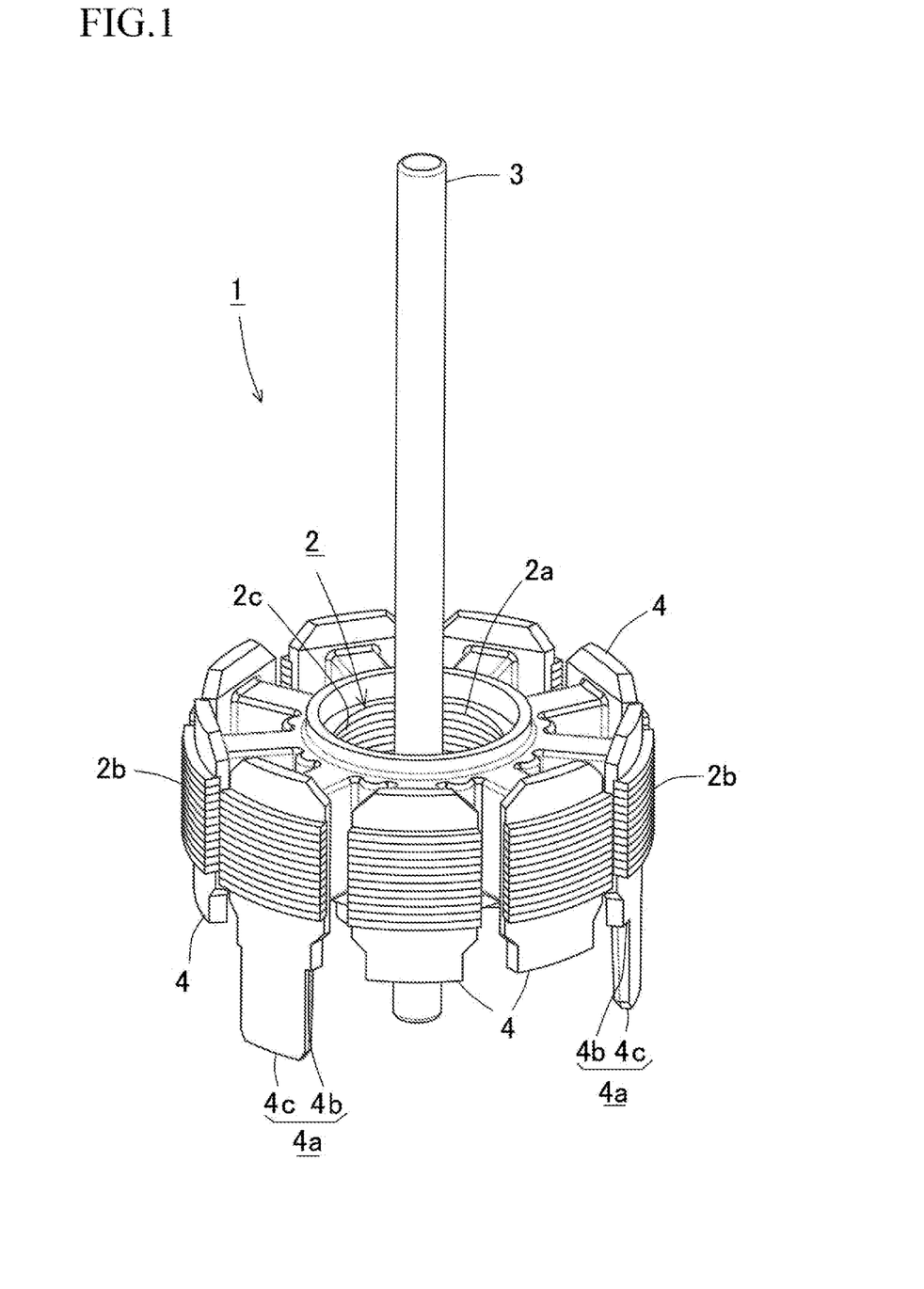
FIG. 1 is an oblique view of a stator unit.

In FIG. 1, a stator unit 1 comprises a stator core 2 having pole teeth 2b protruding radially outside of a core back portion 2a formed in an annular shape. A fixed shaft 3 is inserted into a centre hole 2c in the core back portion 2a of the stator core 2 and insert-moulded by means of a first resin material (an insulating resin material, e.g., PBT: polybutylene terephthalate resin, etc.) to form the stator unit 1. Specifically, the periphery of the core back portion 2a and the pole teeth 2b is covered by means of an insulator 4, and the fixed shaft 3 is integrally moulded with the insulator 4. As will be described later, the fixed shaft 3 constitutes a rotation centre of a rotor unit and renders the rotor shaft as a fixed shaft.

Figure 4:
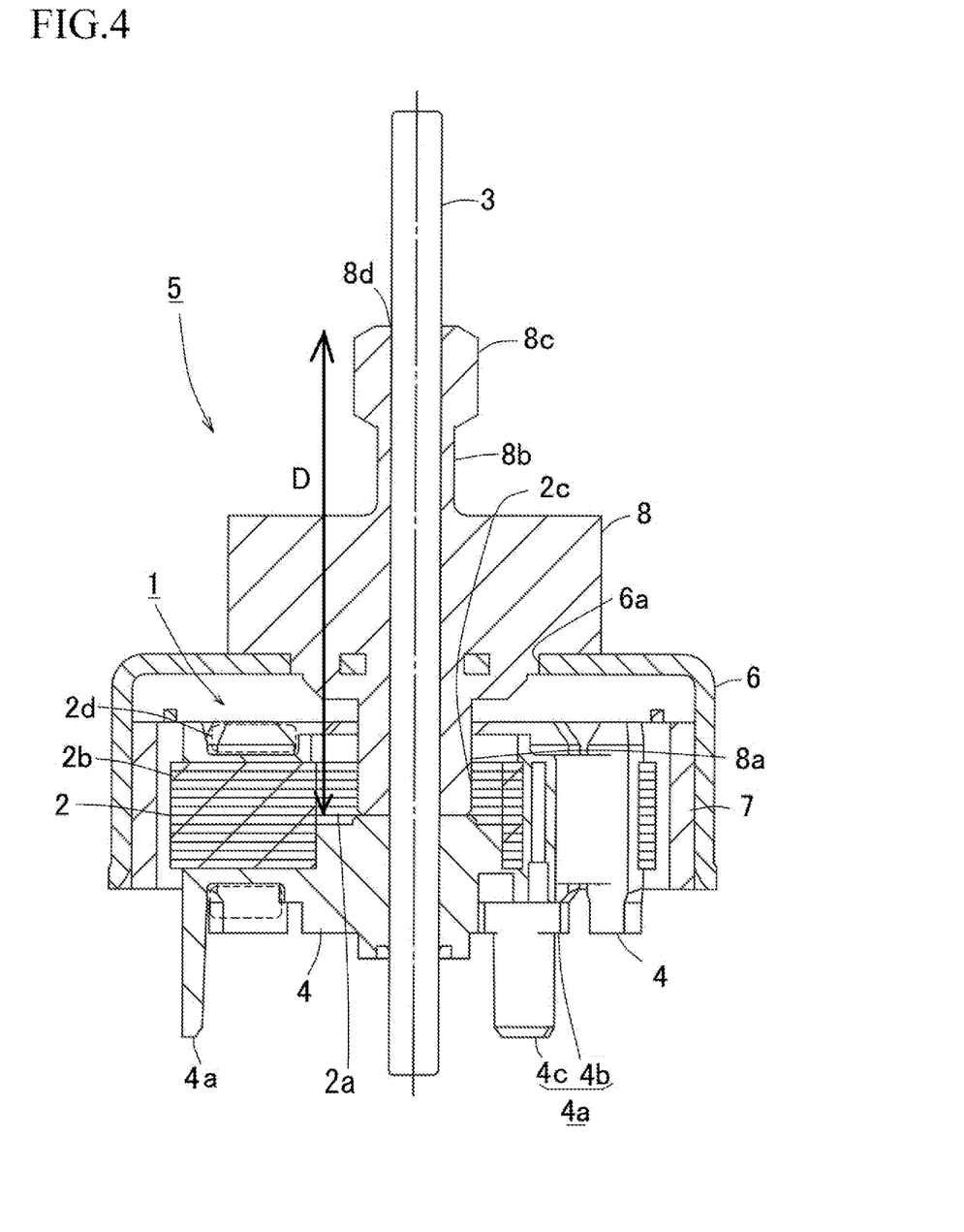
FIG. 4 is a view in axial section of the gear wheel-equipped outer rotor type motor of FIG. 3.

As shown in FIG. 4, the centre hole 2c in the core back portion 2a on one axial end side of the stator core 2 is closed off by means of the insulator 4 joined to the fixed shaft 3. The stator core 2 and the fixed shaft 3 are thus insert-moulded and the centre hole 2c in the core back portion 2a is closed off by means of the insulator 4, so there is no need for an operation to assemble the stator core 2 with a bearing holder, etc., as would be the case conventionally, and since the periphery of the core back portion 2a and the pole teeth 2b is covered by means of the insulator 4, there is no need either for an operation to assemble the insulator 4 with the stator core 2 afterwards, and the ease of assembly is also improved by reducing the number of components.

Furthermore, the stator core 2 is insert-moulded by means of an insulating resin material together with the fixed shaft 3, and is covered by the insulator 4 and assembled as a single piece. The axial perpendicularity of the fixed shaft 3 and the stator core 2 which have been rendered as a single piece by means of insert-moulding is therefore maintained. A magnet wire 2d is wound onto the pole teeth 2b of the stator core 2 which is covered by the insulator 4, and the stator unit 1 is assembled.

Furthermore, as shown in FIG. 1, the insulator 4 that covers each of the pole teeth 2b of the stator core 2 has end portions on the opposite side to the output side which are inserted into insertion holes in a circuit board (not depicted), and circuit board insertion pieces 4a which are welded at a tip end are arranged at equal angles in multiple locations (at least three locations). Stepped portions 4b which butt against the circuit board, and welding portions 4c which are inserted into circuit board insertion holes (not depicted) and are welded while extending as far as the opposite surface of the circuit board are respectively formed on each of the circuit board insertion pieces 4a. It should be noted that a snap-fit engagement or screw-fixing, or else adhesive fixing or the like may be used instead of the welding portions 4c.

Figure 2:
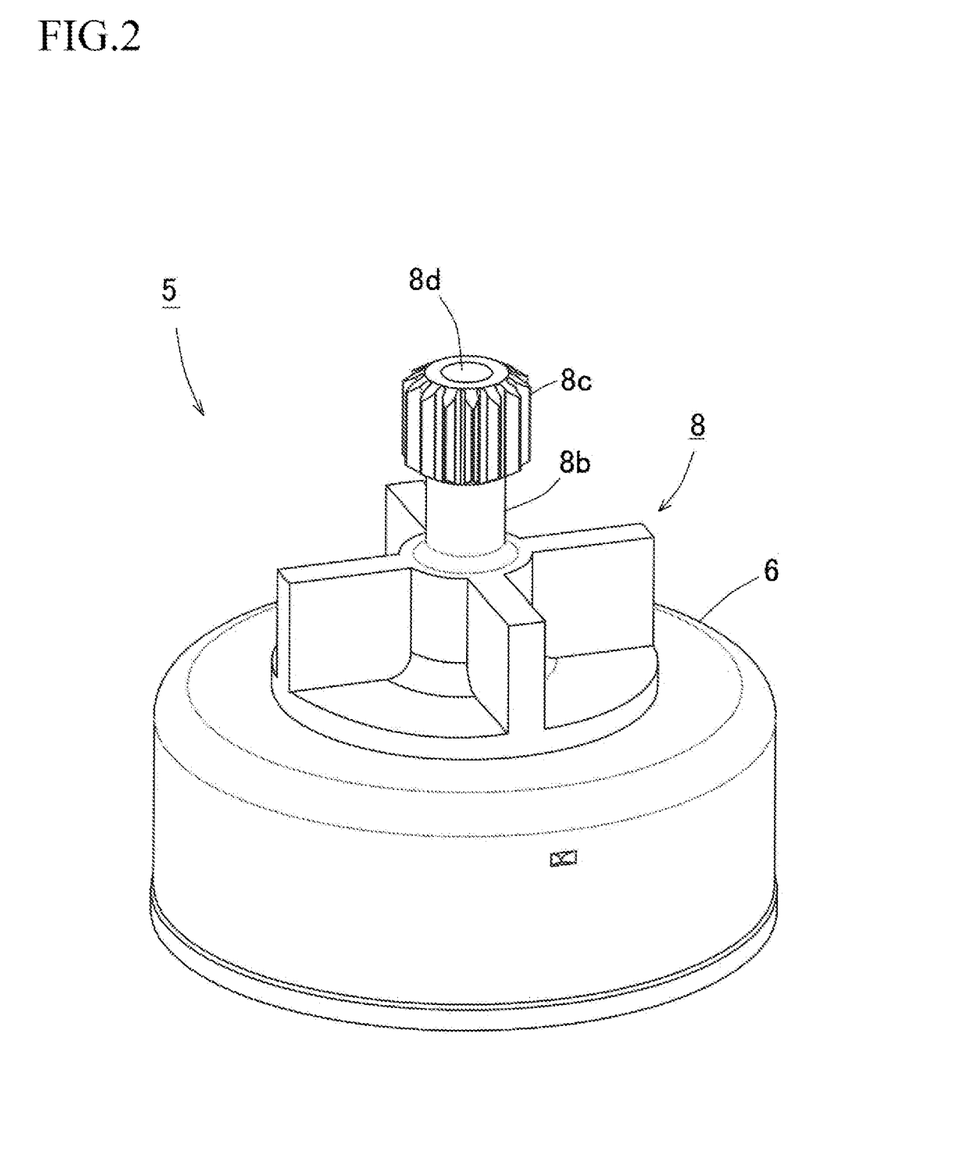
FIG. 2 is an oblique view of a rotor unit.

The configuration of a rotor unit 5 will be described next with reference to FIG. 2 and FIG. 4. As shown in FIG. 2, a magnetic metal material formed into a cup shape is used for a rotor yoke 6, and a lightening hole 6a where a centre portion has been lightened is formed therein (see FIG. 4). An annular rotor magnet 7 is provided on an inner circumferential surface of the rotor yoke 6. The rotor magnet 7 is magnetized in such a way that N poles and S poles are alternately formed in a circumferential direction.

Furthermore, as shown in FIG. 4, the magnetic metal material of the rotor yoke 6 which is formed with the lightening hole 6a in the centre portion thereof to reduce the metal areas as far as possible is insert-moulded using a second resin material having good wear resistance and slideability, e.g., an engineering plastic resin material (POM: polyacetal resin, etc.), whereby a rotor hub 8, including a motor gear wheel 8c which will be described later, is integrally moulded. The rotor hub 8 extends in the axial direction on an inner surface side and an outer surface side of the rotor yoke 6 through the lightening hole 6a.

As shown in FIG. 4, the rotor hub 8 is integrally moulded in a cylindrical shape in a central portion of the rotor yoke 6, and comprises an inside cylindrical portion 8a extending in the axial direction on the inner surface side of the rotor yoke 6, and an outside cylindrical portion 8b extending in the axial direction on the outer surface side of the rotor yoke 6. The motor gear wheel 8c is integrally moulded on a cylinder end portion of the outside cylindrical portion 8b.

Figure 5:
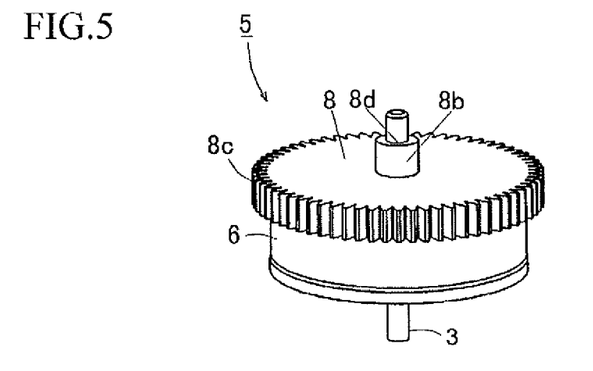
FIG. 5 is an oblique view of a rotor unit according to another example.

It should be noted that the motor gear wheel 8c need not necessarily be provided on the cylinder end portion of the outside cylindrical portion 8b, and it is equally possible for the motor gear wheel 8c to be integrally moulded with the rotor hub 8 on a portion of the outside cylindrical portion 8b on an axial outer surface side of the rotor yoke 6, as shown in FIG. 5, for example.

Figure 6:
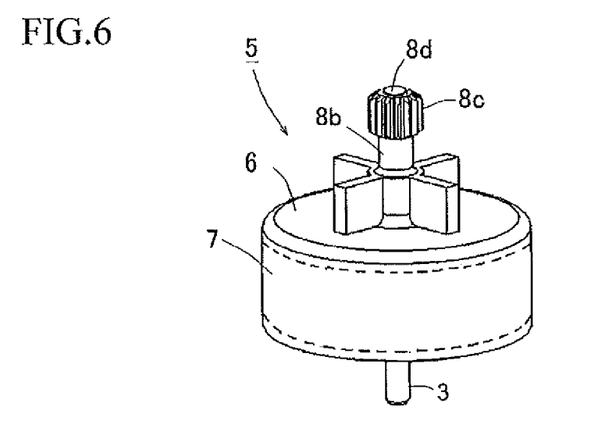
FIG. 6 is an oblique view of a rotor unit according to another example.

In the rotor unit 5, at least the rotor hub 8 with which the motor gear wheel 8c is integrally moulded should be formed from a resin material, and the rotor hub 8 also including a cup-shaped rotor yoke 6 may be integrally moulded using an engineering plastic resin material, for example, as shown in FIG. 6. In this case, the annular rotor magnet 7 is insert-moulded on the inner circumferential surface of the cup-shaped rotor yoke 6 and assembled as a single piece therewith.

Figure 3:
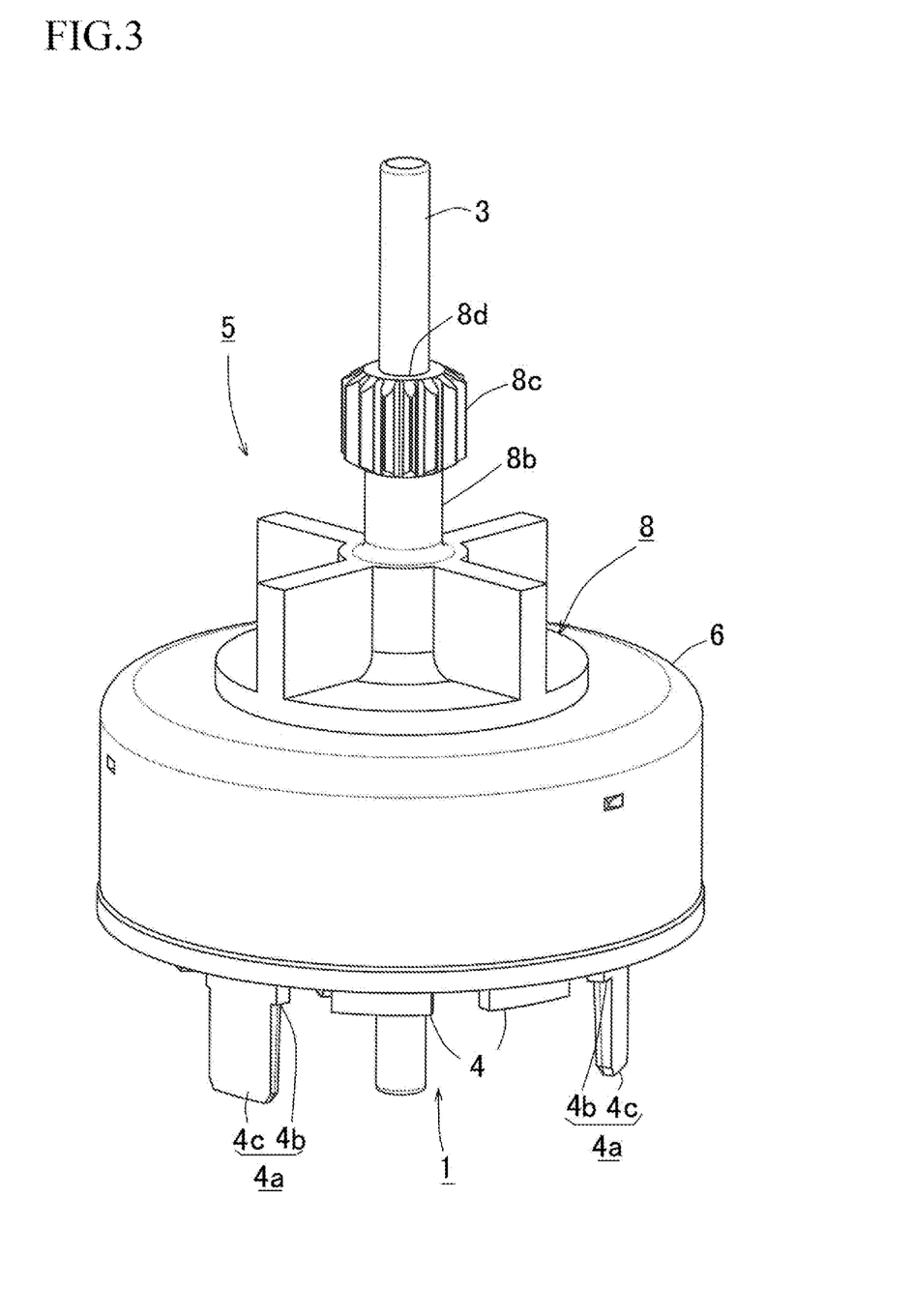
FIG. 3 is an oblique view of a gear wheel-equipped outer rotor type motor.

As shown in FIG. 3, the stator unit 1 and the rotor unit 5 are assembled in such a way that the fixed shaft 3 is inserted into a cylindrical hole 8d in the cylindrical rotor hub 8 and the rotor magnet 7 and the pole teeth 2b are facing, said rotor unit 5 being assembled in such a way as to be slidable and rotatable about the fixed shaft 3. Specifically, the rotor unit 5 is assembled with the stator unit 1 by inserting the inside cylindrical portion 8a of the rotor hub 8 into the centre hole 2c at the other axial end of the core back portion 2a so that the cylinder end portion butts against the insulator 4.

As a result, it is possible to lengthen an axial distance D between load support points (see FIG. 4) from the motor gear wheel 8c by increasing the axial length of the inside cylindrical portion 8a of the rotor hub 8, and it is also possible to lengthen the axial distance D between load support points (see FIG. 4) from the inside cylindrical portion 8a of the rotor hub 8 to the motor gear wheel 8c by providing the motor gear wheel 8c on the cylinder end portion of the outside cylindrical portion 8b of the rotor hub 8. It is therefore possible to maintain the withstand load performance of the motor in relation to external loads, and the lifespan.

Figure 7:
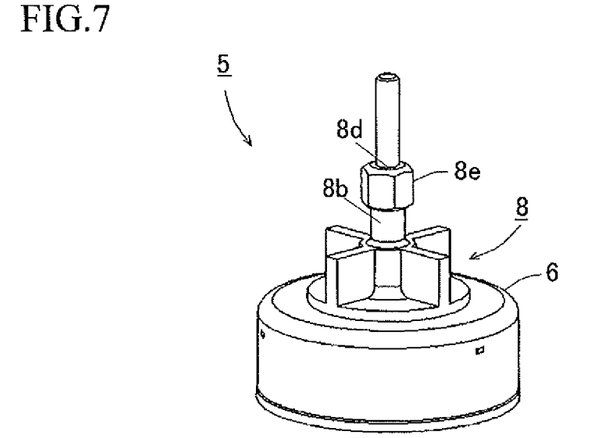
FIG. 7 is an oblique view of a rotor unit according to another example.

In the rotor unit 5 described above, the motor gear wheel 8c was integrally moulded as a power transmission portion on the cylinder end portion of the outside cylindrical portion 8b of the rotor hub 8, but this is not limiting. A coupling portion 8e may equally be formed on a portion of the outside cylindrical portion 8b, as shown in FIG. 7. Specifically, the coupling portion 8e in the shape of a hexagonal prism is formed on the outside cylindrical portion 8b. This coupling portion 8e performs drive transmission by mating with a coupling portion having a hexagonal hole, which is not depicted. It should be noted that the coupling portion 8e is formed on an intermediate portion of the outside cylindrical portion, but it may equally be formed on a cylinder end portion.

As described above, it is possible to reduce the number of components as far as possible and to reduce production costs by employing a resin to form the constituent components of a motor in which metal components are normally used for a rotor yoke, a bearing, a bearing housing, an attachment plate, and a motor gear wheel, etc.

Furthermore, at least the rotor hub 8 of the rotor unit 5 comprises a resin material such as an engineering plastic, for example, and the power transmission portion (motor gear wheel 8c, coupling portion 8e, etc.) is integrally moulded on the outer surface of said rotor hub 8, so it is possible to ensure a sufficient shaft clamping force between the motor gear wheel 8c and the rotor hub 8, instead of a rotor shaft, and processing costs can be reduced because knurling or D-cutting is unnecessary.

Furthermore, it is possible to maintain the withstand load performance of the motor in relation to an external load, and the lifespan, by making the axial distance between load support points from the motor gear wheel 8c provided on the outer surface side of the rotor hub 8 to the cylindrical hole in the rotor hub 8 longer than it would be conventionally.

Additionally, the rotor unit 5 and the stator unit 1 are insert-moulded using the most suitable resin, thereby making it possible to inexpensively provide an outer rotor type motor equipped with a power transmission portion which has fewer constituent components and is easy to assemble.

What is claimed is:

1. Outer rotor type motor equipped with a power transmission portion, in which a rotor is rotatably assembled radially outside a stator, and the power transmission portion is provided on the rotor, said outer rotor type motor equipped with the power transmission portion being characterized in that it comprises:

a stator unit having a stator core comprising a plurality of pole teeth protruding radially outside of a core back portion formed in an annular shape, and an insulator with which a fixed shaft inserted into a centre hole in the core back portion is insert-moulded by means of a first resin material covering the stator core; and a rotor unit in which an annular rotor magnet is provided on an inner circumferential surface of a rotor yoke formed into a cup shape and formed with a lightening hole in a centre position thereof, a rotor hub formed by insert-moulding to the rotor yoke with a second resin material, the rotor hub including an outside cylindrical portion having the power transmission portion, the outside cylindrical portion integrally extends from an outer surface of the rotor hub in an axial direction, and an inside cylindrical portion integrally extends from an inner surface of the rotor hub in the axial direction, wherein at least the periphery of the core back portion and the pole teeth is covered by means of the insulator, and the centre hole in the core back portion is closed off by means of the insulator joined to the fixed shaft, and the stator unit and the rotor unit are assembled in such a way that the fixed shaft is inserted into a center hole of the outside cylinder portion and the inside cylinder portion in the rotor hub, the inside cylindrical portion is inserted into the centre hole of the core back portion until butting against the insulator, and the rotor magnet and the pole teeth are facing each other, said rotor unit being assembled in such a way as to be slidable and rotatable about the fixed shaft.

2. Outer rotor type motor equipped with a power transmission portion according to claim 1, the power transmission portion is a motor gear wheel integrally moulded on a cylinder end portion of the outside cylindrical portion of the rotor hub.

3. Outer rotor type motor equipped with a power transmission portion according to claim 1, the power transmission portion is a coupling portion formed on the outside cylindrical portion of the rotor hub.

* * * * *